(12) United States Patent
Takatani (10) Patent No.: US 9,684,823 B2
(45) Date of Patent: Jun. 20, 2017

(54) MOVING BODY POSITION ESTIMATING DEVICE, MOVING BODY POSITION ESTIMATING METHOD, AND NON-TRANSITORY RECORDING MEDIUM

(71) Applicant: KABUSHIKI KAISHA TOSHIBA, Tokyo (JP)

(72) Inventor: Tsuyoshi Takatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 14/853,159

(22) Filed: Sep. 14, 2015

(65) Prior Publication Data
US 2016/0078288 A1    Mar. 17, 2016

(30) Foreign Application Priority Data

Sep. 16, 2014   (JP) ................................ 2014-188061

(51) Int. Cl.
| | | |
|---|---|---|
| G06K 9/00 | (2006.01) | |
| G06T 7/73 | (2017.01) | |
| G06T 7/246 | (2017.01) | |

(52) U.S. Cl.
CPC .......... *G06K 9/00348* (2013.01); *G06T 7/246* (2017.01); *G06T 7/73* (2017.01);
(Continued)

(58) Field of Classification Search
None
See application file for complete search history.

(56) References Cited

U.S. PATENT DOCUMENTS

| | | | | |
|---|---|---|---|---|
| 6,639,596 B1 * | 10/2003 | Shum | ..................... | G06K 9/209 345/427 |
| 7,893,963 B2 * | 2/2011 | Gallagher | .......... | H04N 5/23248 348/208.6 |

(Continued)

FOREIGN PATENT DOCUMENTS

| | | |
|---|---|---|
| EP | 1959675 | 8/2008 |
| JP | 6-314340 | 11/1994 |

(Continued)

OTHER PUBLICATIONS

International Patent Application Publication No. WO 2013/161182 A1.*

(Continued)

*Primary Examiner* — Matthew Bella
*Assistant Examiner* — Soo Shin
(74) *Attorney, Agent, or Firm* — Nixon & Vanderhye, P.C.

(57) ABSTRACT

A moving body position estimating device includes an acquisition unit and a processor. The acquisition unit acquires information including first data relating to a first image and second data relating to a second image including a difference between the first image and the second image accompanying a movement of a moving body. The processor implements estimating, based on the information, a direction of a rotation accompanying the movement; detecting, based on the direction of the rotation, first feature points inside a first region inside the first image and second feature points inside a second region inside the first image; and determining first corresponding points inside a third region inside the second image and estimating a change of a position of the moving body based on each of the first feature points and each of the first corresponding points.

20 Claims, 9 Drawing Sheets

(52) U.S. Cl.
CPC ............... *G06K 2209/40* (2013.01); *G06T 2207/30196* (2013.01); *G06T 2207/30241* (2013.01); *G06T 2207/30244* (2013.01)

(56) References Cited

U.S. PATENT DOCUMENTS

| | | | |
|---|---|---|---|
| 8,229,249 B2* | 7/2012 | Seki | ............... G06T 7/285 382/103 |
| 2007/0058838 A1 | 3/2007 | Taniguchi | |
| 2008/0199050 A1* | 8/2008 | Koitabashi | ............... B60R 1/00 382/107 |
| 2009/0296986 A1* | 12/2009 | Obana | ............... G06T 7/246 382/103 |
| 2010/0226544 A1 | 9/2010 | Uchida et al. | |
| 2010/0245604 A1* | 9/2010 | Ohmiya | ............... G03B 5/00 348/208.99 |
| 2011/0298988 A1* | 12/2011 | Kawai | ............... G06T 5/006 348/699 |
| 2012/0162449 A1 | 6/2012 | Braun et al. | |
| 2012/0269382 A1 | 10/2012 | Kiyohara et al. | |
| 2012/0281104 A1* | 11/2012 | Ohmiya | ............... G06T 7/33 348/208.6 |
| 2014/0267594 A1* | 9/2014 | Furumura | ............... H04N 5/23238 348/36 |
| 2015/0077434 A1* | 3/2015 | Fukuchi | ............... G06F 3/011 345/633 |
| 2015/0172626 A1* | 6/2015 | Martini | ............... G06T 7/0008 348/50 |
| 2015/0269778 A1* | 9/2015 | Uchiyama | ............... G06K 9/6215 345/633 |
| 2016/0080644 A1 | 3/2016 | Uchiyama et al. | |

FOREIGN PATENT DOCUMENTS

| | | |
|---|---|---|
| JP | 2007-78476 | 3/2007 |
| JP | 2009-074859 | 4/2009 |
| JP | 2009-156611 | 7/2009 |
| JP | 2009-217490 | 9/2009 |
| JP | 2009-266003 | 11/2009 |
| JP | 2015-184054 | 10/2015 |
| JP | 2016-061654 | 4/2016 |

OTHER PUBLICATIONS

Extended Search Report mailed Feb. 18, 2016 in counterpart European Patent Application No. 15185044.3.

* cited by examiner

MOVING BODY POSITION ESTIMATING DEVICE, MOVING BODY POSITION ESTIMATING METHOD, AND NON-TRANSITORY RECORDING MEDIUM

CROSS-REFERENCE TO RELATED APPLICATIONS

This application is based upon and claims the benefit of priority from Japanese Patent Application No. 2014-188061, filed on Sep. 16, 2014; the entire contents of which are incorporated herein by reference.

FIELD

Embodiments described herein relate generally to a moving body position estimating device, a moving body position estimating method, and a non-transitory recording medium.

BACKGROUND

A moving body position estimating device estimates the position of a moving body in three-dimensional space based on images that are imaged by a camera or the like mounted to the moving body. It is desirable to increase the precision of the position estimation of the moving body position estimating device for changes in the surrounding environment.

BRIEF DESCRIPTION OF THE DRAWINGS

FIG. 5A to FIG. 5C are schematic views showing the processing by the feature point detector.

DETAILED DESCRIPTION

According to one embodiment, a moving body position estimating device includes an acquisition unit and a processor. The acquisition unit acquires information including first data and second data. The first data is relating to a first image. The second data is relating to a second image. The second image includes a difference between the first image and the second image accompanying a movement of a moving body. The processor implements direction estimation processing to estimate, based on the information, a direction of a rotation accompanying the movement. The processor implements detection processing to detect, based on the direction of the rotation, a plurality of first feature points inside a first region inside the first image and a plurality of second feature points inside a second region inside the first image. A first density inside the first region of the plurality of first feature points is higher than a second density inside the second region of the plurality of second feature points. The processor implements position estimation processing to determine a plurality of first corresponding points inside a third region inside the second image and estimate a change of a position of the moving body based on each of the plurality of first feature points and each of the plurality of first corresponding points. Each of the plurality of first corresponding points corresponds respectively to at least one of the plurality of first feature points.

According to another embodiment, a moving body position estimating device includes an acquisition unit and a processor. The acquisition unit acquires information including first data and second data. The first data is relating to a first image. The second data is relating to a second image. The second image includes a difference between the first image and the second image accompanying a movement of a moving body. The processor implements direction estimation processing to estimate, based on the information, a direction of a change of a position of the moving body accompanying the movement. The processor implements detection processing to detect, based on the direction of the change of the position, a plurality of first feature points inside a first region inside the first image and a plurality of second feature points inside a second region inside the first image. A first density inside the first region of the plurality of first feature points is higher than a second density inside the second region of the plurality of second feature points. The processor implements position estimation processing to determine a plurality of first corresponding points inside a third region inside the second image and estimate the change of the position of the moving body based on each of the plurality of first feature points and each of the plurality of first corresponding points. Each of the plurality of first corresponding points corresponds respectively to at least one of the plurality of first feature points.

According to another embodiment, a moving body position estimating method includes acquiring information including first data and second data. The first data is relating to a first image. The second data is relating to a second image. The second image includes a difference between the first image and the second image accompanying a movement of a moving body. The method includes estimating, based on the information, a direction of a rotation accompanying the movement. The method includes detecting, based on the direction of the rotation, a plurality of first feature points inside a first region inside the first image and a plurality of second feature points inside a second region inside the first image. A first density inside the first region of the plurality of first feature points is higher than a second density inside the second region of the plurality of second feature points. The method includes determining a plurality of first corresponding points inside a third region inside the second image and estimating a change of a position of the moving body based on each of the plurality of first feature points and each of the plurality of first corresponding points. Each of the plurality of first corresponding points corresponds respectively to at least one of the plurality of first feature points.

According to another embodiment, a non-transitory recording medium records a moving body position estimating program. The program causes a computer to execute, acquiring information including first data and second data. The first data is relating to a first image. The second data is relating to a second image. The second image includes a difference between the first image and the second image accompanying a movement of a moving body. The program causes the computer to execute, estimating, based on the information, a direction of a rotation accompanying the movement. The program causes the computer to execute, detecting, based on the direction of the rotation, a plurality of first feature points inside a first region inside the first image and a plurality of second feature points inside a second region inside the first image. A first density inside the first region of the plurality of first feature points is higher than a second density inside the second region of the plurality of second feature points. The program causes the computer to execute, determining a plurality of first corresponding points inside a third region inside the second image and estimating a change of a position of the moving body based on each of the plurality of first feature points and each of the plurality of first corresponding points. Each of the plurality of first corresponding points corresponds respectively to at least one of the plurality of first feature points.

Various embodiments of the invention will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

Figure 1:
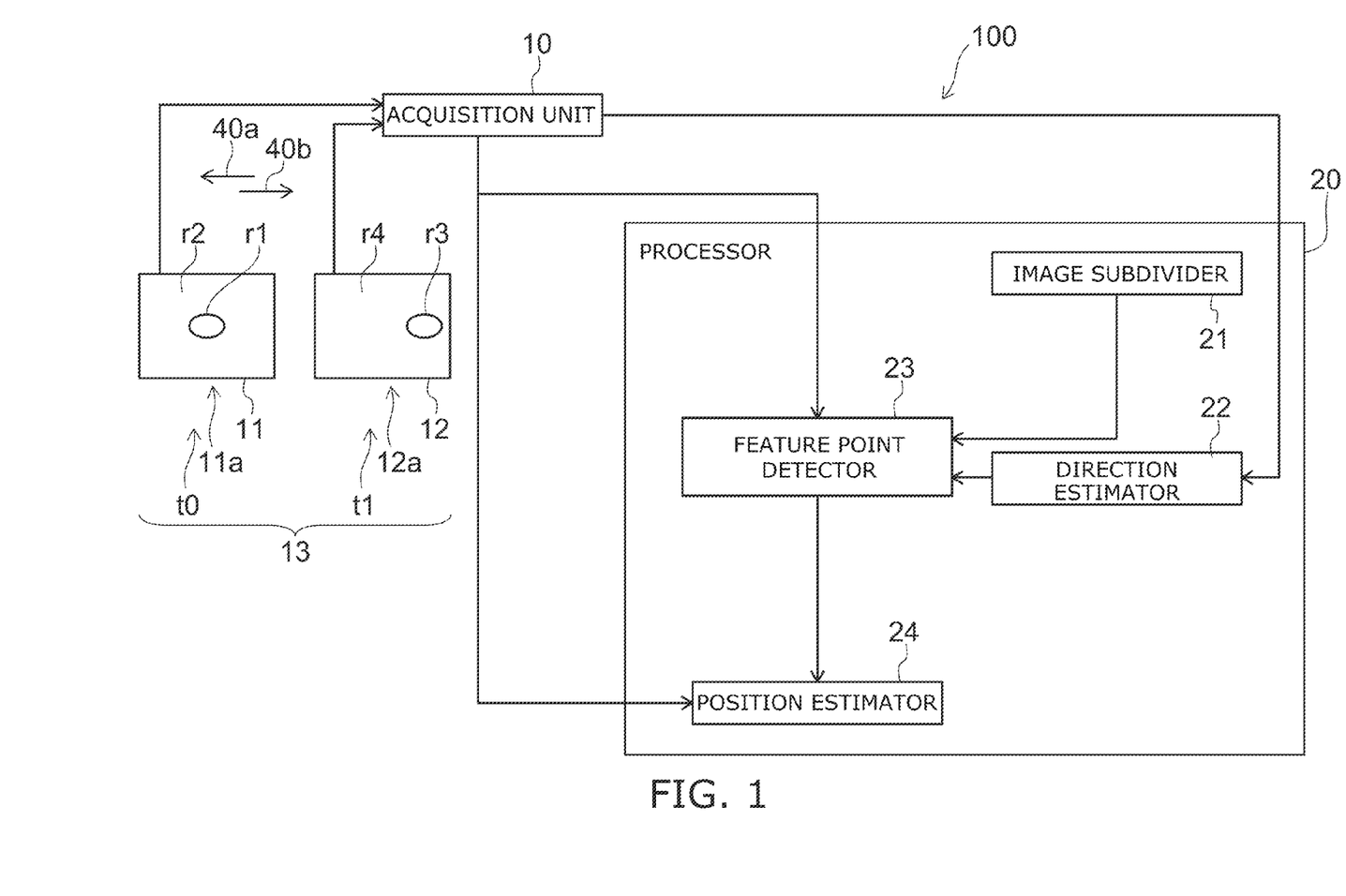
FIG. 1 is a block diagram showing a moving body position estimating device according to a first embodiment.

FIG. 1 is a block diagram showing a moving body position estimating device according to a first embodiment.

An acquisition unit 10 and a processor 20 are provided in the moving body position estimating device 100. The acquisition unit 10 includes, for example, an input/output terminal. The acquisition unit 10 includes an input/output interface that communicates with the outside via a wired or wireless method. The processor 20 includes, for example, a calculator including a CPU, memory, etc. A portion of each block or each entire block of the processor 20 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as a single body; or some blocks may be provided separately. Also, for each block, a portion of the block may be provided separately. The integration is not limited to LSI; and a dedicated circuit or a general-purpose processor may be used.

The acquisition unit 10 acquires information 13. The information 13 includes first data 11a and second data 12a. The first data 11a relates to a first image 11 including a first region r1 and a second region r2. The second data 12a relates to a second image 12 including a third region r3 corresponding to the first region r1. The second image 12 may further include a fourth region r4 corresponding to the second region r2. The second image 12 includes a difference between the first image 11 and the second image 12 accompanying the movement of a moving body. For example, the first image 11 is imaged at time t0; and the second image 12 is imaged at time t1 (>time t0). The second image 12 may be imaged at time t0; and the first image 11 may be imaged at time t1 (>time t0). The first image 11 and the second image 12 are chronologically different images.

An image subdivider 21, a direction estimator 22, a feature point detector 23, and a position estimator 24 are provided in the processor 20. For example, these components are realized as a moving body position estimating program. In other words, the moving body position estimating device 100 may be realized by using a general-purpose computer device as the basic hardware. The function of each component included in the moving body position estimating device 100 may be realized by causing a processor mounted in the computer device recited above to execute the moving body position estimating program. In such a case, the moving body position estimating device 100 may be realized by preinstalling the moving body position estimating program recited above in the computer device; or the moving body position estimating device 100 may be realized by distributing the moving body position estimating program recited above stored in a storage medium such as CD-ROM, etc., or via a network and appropriately installing the moving body position estimating program in the computer device. The realization is possible by the processor 20 appropriately utilizing a storage medium such as memory, a hard disk, CD-R, CD-RW, DVD-RAM, DVD-R, etc., external to or built into the computer device recited above.

Figure 2:
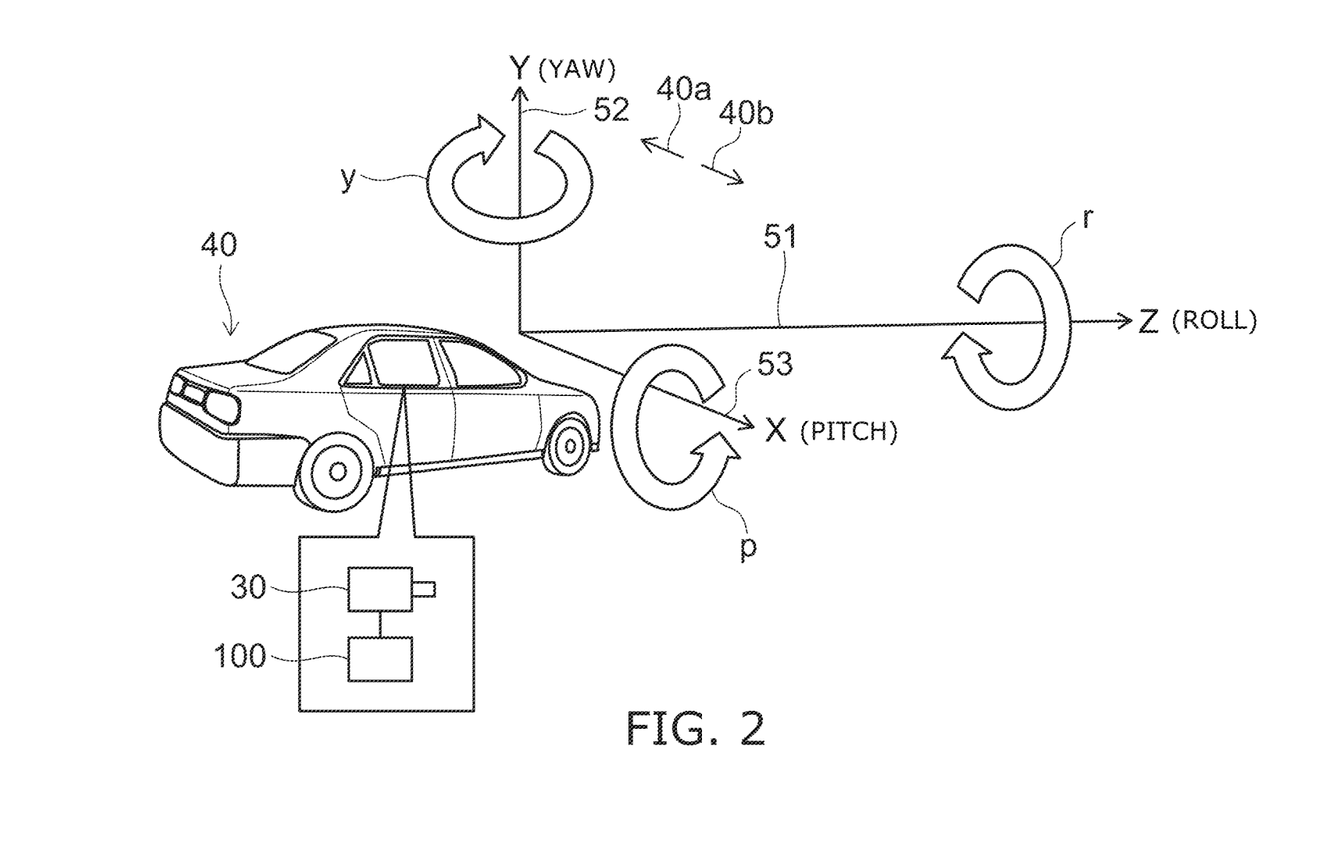
FIG. 2 is a schematic view showing the moving body, the imaging unit, and the moving body position estimating device.

FIG. 2 is a schematic view showing the moving body, the imaging unit, and the moving body position estimating device.

The moving body position estimating device 100 is used to estimate the position in three-dimensional space of a moving body 40. For example, general moving bodies such as an automobile, an UAV (Unmanned Aerial Vehicle), etc., may be used as the moving body 40. One or more imaging units 30 is mounted to the moving body 40. The method for mounting the imaging unit 30 is not particularly limited. For example, the imaging unit 30 is mounted so that the depth direction (the imaging direction) of the imaging unit 30 is parallel to the major travel direction of the moving body 40. The imaging unit 30 may be mounted so that the depth direction (the imaging direction) of the imaging unit 30 is perpendicular to the major travel direction of the moving body 40.

For example, the moving body position estimating device 100 is mounted with the imaging unit 30 to the moving body 40. The moving body position estimating device 100 may be provided at a location different from the moving body 40. That is, it is sufficient for the moving body position estimating device 100 to be communicatably connected to the imaging unit 30 regardless of the placement location.

The case will now be described where the imaging unit 30 is mounted so that the depth direction of the imaging unit 30 is parallel to the moving body major travel direction. The position and orientation of the imaging unit 30 in the first image acquisition is used as a reference; and the position and orientation of the imaging unit 30 in the second and subsequent image acquisitions are expressed with respect to the reference. However, the setting of the reference is not limited thereto; and it is sufficient for a relative position and orientation to be used.

Figure 3:
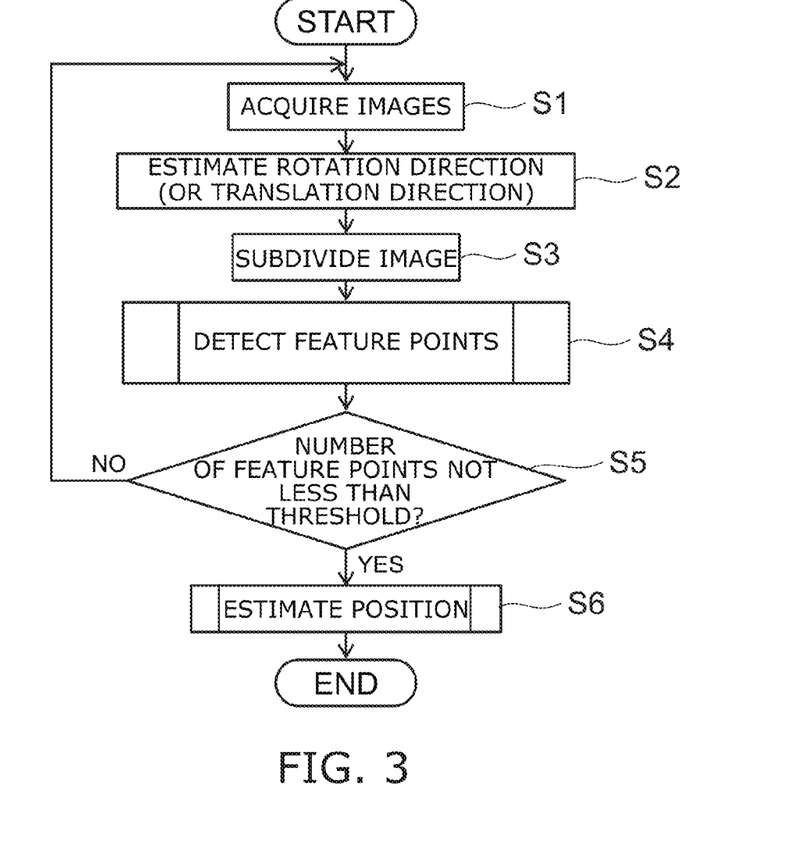
FIG. 3 is a flowchart showing a moving body position estimating method according to the first embodiment.

FIG. 3 is a flowchart showing a moving body position estimating method according to the first embodiment.

The acquisition unit 10 acquires the information 13 including the first image 11 and the second image 12 that are imaged by the imaging unit 30 (step S1).

Based on the information 13, the direction estimator 22 implements the direction estimation processing to estimate the direction of the rotation accompanying the movement of the moving body 40 (step S2).

In the example, the chronological change of the position and orientation of the imaging unit 30 is considered to be the chronological change of the position and orientation of the moving body 40. Specifically, two chronologically-different images that are imaged by the imaging unit 30 are used. For example, the first image 11 and the second image 12 are used as the two images. In other words, the direction estimator 22 estimates the change of the orientation of the moving body 40 based on the first image 11 and the second image 12 and estimates the direction of the rotation of the movement of the moving body 40 based on the change of the orientation.

In FIG. 1 and FIG. 2, a second direction 40b from the second region r2 toward the first region r1 inside the first image 11 has a component in the reverse direction of a first direction 40a when the direction of the rotation of the moving body 40 is the first direction 40a. For example, the first direction 40a is one of the left direction or the right direction; and the second direction 40b is the other of the left direction or the right direction.

In the example of FIG. 1, the first direction 40a is the left direction and the second direction 40b is the right direction because the rotation direction of the moving body 40 is the left direction. Here, the third region r3 is positioned to the right of the first region r1 when the first image 11 and the second image 12 are overlaid. In other words, the direction from the first region r1 toward the third region r3 is aligned with the second direction 40b when the first image 11 and the second image 12 are overlaid. Thereby, the rotation direction can be estimated from the two images. The direction estimator 22 estimates the change of the position of the moving body 40 based on the first image 11 and the second image 12; and the translation direction of the movement of the moving body 40 may be estimated based on the change of the position. Here, the translation direction is the direction of the change of the position of the moving body 40.

In the case of the translation direction, the first region r1 and the third region r3 overlap when the first image 11 and the second image 12 are overlaid. Thereby, the translation direction can be estimated from the two images.

The coordinate system shown in FIG. 2 is set for the moving body 40. Namely, a frontward/rearward (roll) axis 51 of the moving body 40 is taken as a Z-axis. A vertical (yaw) axis 52 of the moving body 40 is taken as a Y-axis. A lateral (pitch) axis 53 of the moving body 40 is taken as an X-axis. The X-axis, the Y-axis, and the Z-axis are orthogonal to each other in three-dimensional space. One direction perpendicular to the X-axis direction is taken as the Y-axis direction. A direction perpendicular to the X-axis direction and perpendicular to the Y-axis direction is taken as the Z-axis direction. The rotation angle in the vertical direction around the lateral axis 53 (the X-axis) is taken as a pitch angle p; the rotation angle in the lateral direction around the vertical axis 52 (the Y-axis) is taken as a yaw angle y; and the rotation angle around the frontward/rearward axis 51 (the Z-axis) is taken as a roll angle r. This setting of the coordinate system is an example.

The position and orientation of the imaging unit 30 at time t0 is expressed by P0=[R0|t0]. The position and orientation of the imaging unit 30 at time t1 which is different from time W is expressed by P1=[R1|t1]. R0 and R1 are rotation matrixes; and t0 and t1 are translation vectors. The change of the relative position and orientation from time t0 to time t1 is expressed by $$\Delta R = R0^\wedge T R1$$

$$\Delta t = R0^\wedge T (t1 - t0).$$

Here, $\Delta R$ is the change of the orientation; $\Delta t$ is the change of the position; and $^\wedge T$ is the transpose.

The translation direction is taken to be the direction in which the absolute value of the component of $\Delta t$ is a maximum. For example, the translation direction is the +Z direction for $\Delta t = (0, 0, 1)$. The translation direction is the −X direction for $\Delta t = (-1, 0, 0)$. However, this method for estimating is an example; and, for example, in the case where $\Delta t$ is considered to be a direction vector, a total of 512 directions can be defined by quantizing the rotation angle into 8 directions for each axis.

Each component of $\Delta R$ is transformed into each component of roll, pitch, and yaw; and the rotation direction is taken to be the direction in which the absolute value of each transformed component is not less than a threshold. For example, when the threshold is set to 30, the rotation direction is the −yaw direction for $\Delta R = (1, 5, -45)$. However, this method for estimating is an example; and, for example, a total of 512 directions can be defined by quantizing each component into 8 stages.

For example, a method such as SfM (Structure from Motion), etc., may be used as the method for estimating the position and orientation of the imaging unit 30. Thereby, the position and orientation of the imaging unit 30 can be estimated from two or more chronologically different images. In this method, it is necessary to detect feature points from the images. The detection of the feature points can be implemented using the methods described below.

The image subdivider 21 implements image subdivision processing to determine the position inside the first image 11 of the first region r1 and the position inside the first image 11 of the second region r2 (step S3).

Figure 4:
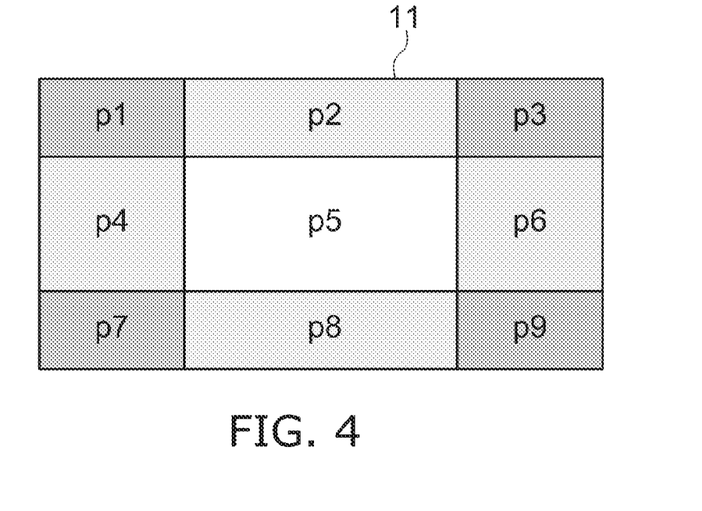
FIG. 4 is a schematic view showing the image subdivision processing by the image subdivider.

FIG. 4 is a schematic view showing the image subdivision processing by the image subdivider 21.

The image subdivider 21 implements image subdivision processing to subdivide the first image 11 into multiple portions p1 to p9. For example, the image plane is subdivided into three by three rectangular portions for a total of nine rectangular portions. However, the subdividing method is an example; and, for example, the image plane may be subdivided into two rectangular portions in the vertical direction. For example, the image may be subdivided into a circular portion and a portion of the image other than the circular portion, where the circular portion has a center at the image center and a diameter that is half of the height of the image. For example, the image may be subdivided into a radial configuration from the image center toward the image periphery. The image may be subdivided into portions in the image depth direction in the case where the feature point positions are obtained in three-dimensional real space. For example, the image may be subdivided into portions in three-dimensional real space at a spacing of 10 meters for a distance from the imaging unit 30 of 0 to 100 meters.

The feature point detector 23 detects multiple first feature points inside the first region r1 and multiple second feature points inside the second region r2 based on the direction of the rotation estimated in step S2 (step S4).

Figure 5A:
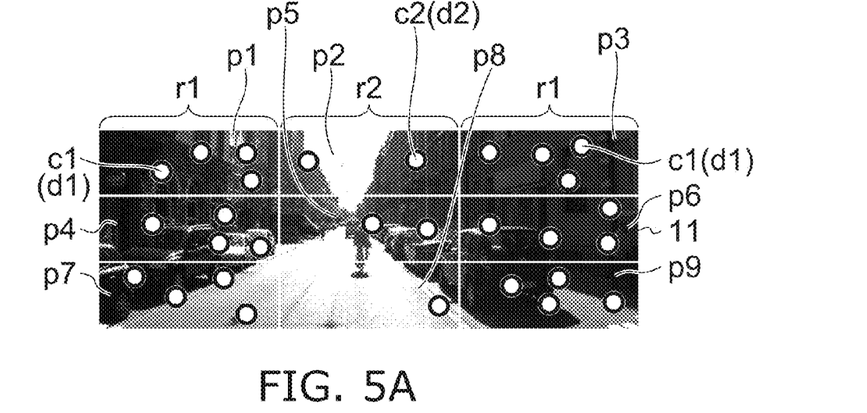
Figure 5B:
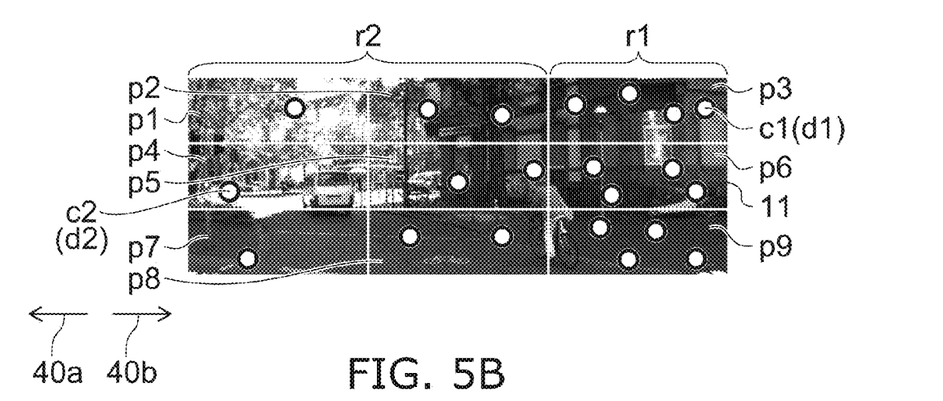
Figure 5C:
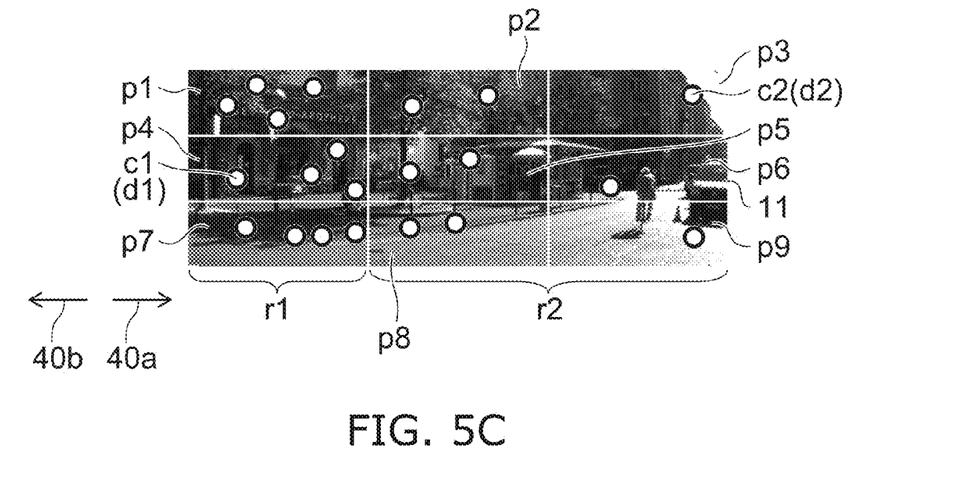

FIG. 5A to FIG. 5C are schematic views showing the processing by the feature point detector 23.

FIG. 5A shows the processing in the case where the rotation direction is around the frontward/rearward axis 51.

FIG. 5B shows processing in the case where the rotation direction is leftward around the vertical axis 52. FIG. 5C shows processing in the case where the rotation direction is rightward around the vertical axis 52.

The feature point detector 23 detects the multiple feature points from the first image 11 based on the rotation direction estimated by the direction estimator 22. Specifically, the feature point detector 23 implements detection processing based on the rotation direction recited above to perform the detection so that a first density d1 inside the first region r1 of multiple first feature points c1 is higher than a second density d2 inside the second region r2 of multiple second feature points c2. Characteristic pixels (e.g., corners, edges, etc.) in the image are detected as the feature points. For example, various methods such as the Harris corner detection method, the Shi-Tomasi method, FAST feature detection, SUSAN operators, etc., may be used. The position inside the first image 11 of the first region r1 and the position inside the first image 11 of the second region r2 are determined based on the image subdivision positions of FIG. 4.

In the example of FIG. 5A, it is estimated that the moving body 40 is traveling straight when the direction of the rotation is around the frontward/rearward axis 51 of the moving body 40, that is, when the angle of the rotation is not more than a determined value. In such a case, the second region r2 includes the center (e.g., the portions p2, p5, and p8) of the first image 11. The first region r1 is provided around the second region r2 (e.g., at the portions p1, p3, p4, p6, p7, and p9) inside the first image 11. That is, the left-side portions (the portions p1, p4, and p7) and the right-side portions (the portions p3, p6, and p9) of the first image 11 are used as the first region r1. The central portions (the portions p2, p5, and p8) of the first image 11 are used as the second region r2. The detection is performed so that the first density d1 inside the first region r1 of the multiple first feature points c1 is higher than the second density d2 inside the second region r2 of the multiple second feature points c2.

In the example of FIG. 5B, the first direction 40a is the left direction; and the second direction 40b is the right direction. It is estimated that the moving body 40 is turning left when the direction of the rotation is leftward around the vertical axis 52 of the moving body 40, that is, when the direction of the rotation is the left direction. In such a case, the first region r1 is positioned on the right side of the second region r2 inside the first image 11. In the example, the left-side portions (the portions p1, p4, and p7) and the central portions (the portions p2, p5, and p8) of the first image 11 are used as the second region r2. The right-side portions (the portions p3, p6, and p9) of the second region r2 are used as the first region r1. Similarly, the detection is performed so that the first density d1 inside the first region r1 of the multiple first feature points c1 is higher than the second density d2 inside the second region r2 of the multiple second feature points c2.

In the example of FIG. 5C, the first direction 40a is the right direction; and the second direction 40b is the left direction. It is estimated that the moving body 40 is turning right when the direction of the rotation is rightward around the vertical axis 52 of the moving body 40, that is, when the direction of the rotation is the right direction. In such a case, the first region r1 is positioned on the left side of the second region r2 inside the first image 11. In the example, the right-side portions (the portions p3, p6, and p9) and the central portions (the portions p2, p5, and p8) of the first image 11 are used as the second region r2. The left-side portions (the portions p1, p4, and p7) of the second region r2 are used as the first region r1. Similarly, the detection is performed so that the first density d1 inside the first region r1 of the multiple first feature points c1 is higher than the second density d2 inside the second region r2 of the multiple second feature points c2.

In the case where the moving body 40 is a flying object, etc., the first direction 40a may be set to be one of the upward direction or the downward direction; and the second direction may be set to be the other of the upward direction or the downward direction. That is, it is estimated that the moving body 40 is ascending when the direction of the rotation is upward around the lateral axis 53 of the moving body 40, that is, when the direction of the rotation is the upward direction. In such a case, the first region r1 is positioned on the lower side of the second region r2 inside the first image 11. In the example of FIG. 4, the upper portions (the portions p1, p2, and p3) and the central portions (the portions p4, p5, and p6) of the first image 11 are used as the second region r2. The lower portions (the portions p7, p8, and p9) of the second region r2 are used as the first region r1. Similarly, the detection is performed so that the first density d1 inside the first region r1 of the multiple first feature points c1 is higher than the second density d2 inside the second region r2 of the multiple second feature points c2.

It is estimated that the moving body 40 is descending when the direction of the rotation is downward around the lateral axis 53 of the moving body 40, that is, when the direction of the rotation is the downward direction. In such a case, the first region r1 is positioned on the upper side of the second region r2 inside the first image 11. In the example of FIG. 4, the lower portions (the portions p7, p8, and p9) and the central portions (the portions p4, p5, and p6) of the first image 11 are used as the second region r2. The upper portions (the portions p1, p2, and p3) of the second region r2 are used as the first region r1. Similarly, the detection is performed so that the first density d1 inside the first region r1 of the multiple first feature points c1 is higher than the second density d2 inside the second region r2 of the multiple second feature points c2.

Figure 6:
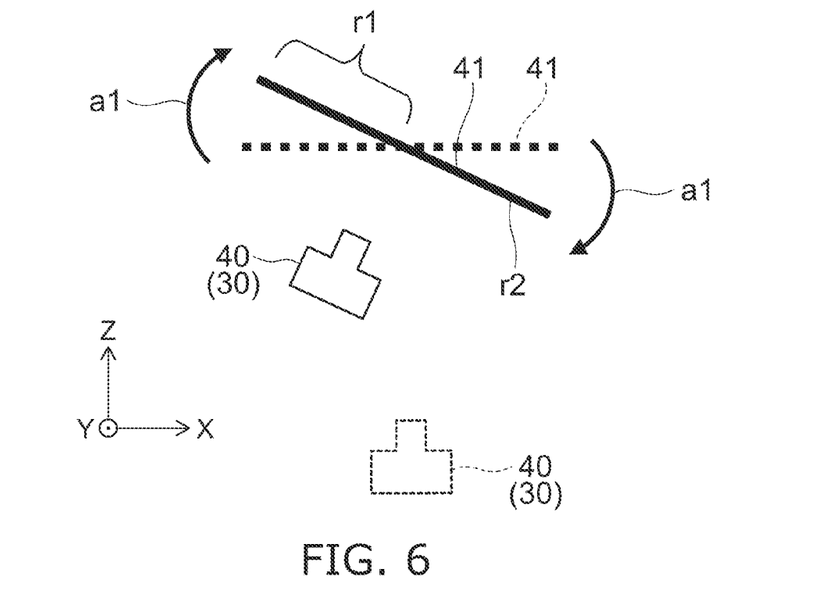
FIG. 6 is a schematic view illustrating examples of FIG. 5B and FIG. 5C.

FIG. 6 is a schematic view illustrating examples of FIG. 5B and FIG. 5C.

FIG. 6 shows the state in which the moving body 40 is projected onto the ZX plane.

An image 41 is imaged by the imaging unit 30 mounted to the moving body 40. When the moving body 40 moves (e.g., turns right), the image 41 also rotates (here, a right rotation) in the direction of arrow a1 accompanying the movement. In such a case, for the moving body 40, the left side of the image 41 is used as the first region r1; and the right side of the image 41 is used as the second region r2.

Here, in the case where the translation direction of the movement of the moving body 40 is estimated, the feature point detector 23 implements, based on the translation direction, the detection processing to detect the first density d1 inside the first region r1 of the multiple first feature points c1 to be higher than the second density d2 in the second region r2 of the multiple second feature points c2.

In the example of FIG. 5A described above, it is estimated that the moving body 40 is traveling straight when the translation direction is the direction of the frontward/rearward axis 51 of the moving body 40, i.e., the frontward/rearward direction. In such a case, the second region r2 includes the centers (e.g., the portions p2, p5, and p8) of the first image 11. The first region r1 is provided around the second region r2 (e.g., at the portions p1, p3, p4, p6, p7, and p9) inside the first image 11. That is, the left-side portions (the portions p1, p4, and p7) and the right-side portions (the portions p3, p6, and p9) of the first image 11 are used as the first region r1. The central portions (the portions p2, p5, and p8) of the first image 11 are used as the second region r2. The detection is performed so that the first density d1 inside the first region r1 of the multiple first feature points c1 is higher than the second density d2 inside the second region r2 of the multiple second feature points c2.

Figure 7:
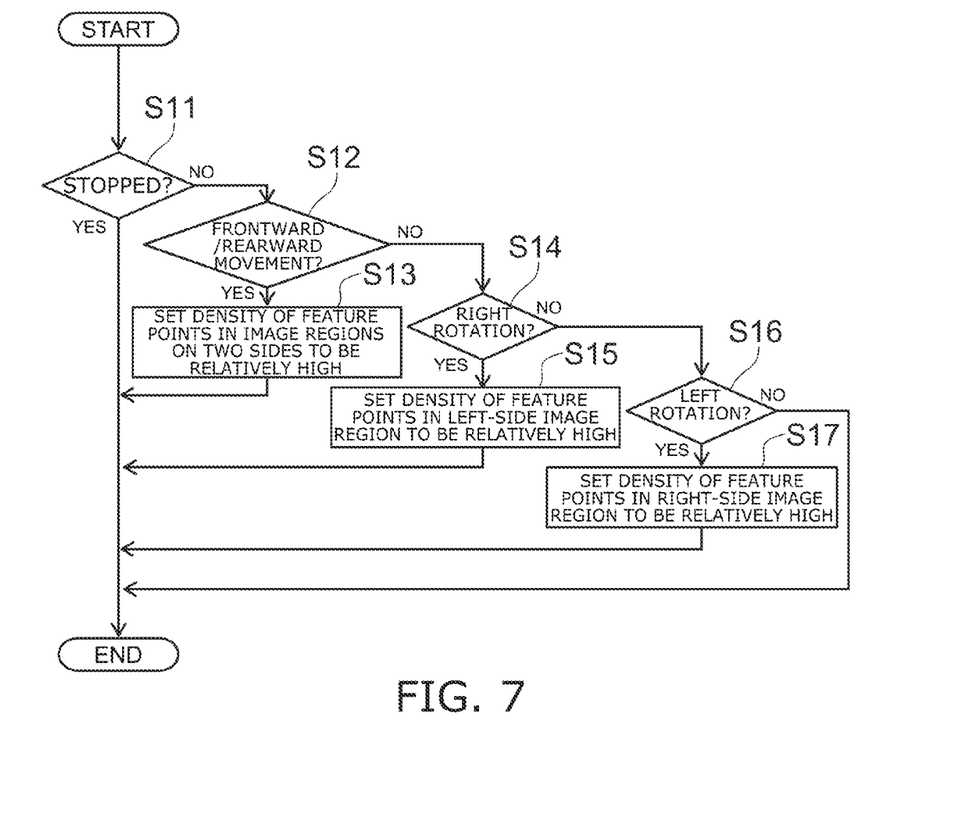
FIG. 7 is a flowchart showing the feature point detection processing by the feature point detector.

FIG. 7 is a flowchart showing the feature point detection processing by the feature point detector 23.

The feature point detector 23 determines whether or not the moving body 40 is stopped based on the information of the rotation direction (or the translation direction) estimated by the direction estimator 22 (step S11) and ends the processing in the case where it is determined that the moving body 40 is stopped (the case of YES). In the case where it is determined in step S11 that the moving body 40 is not stopped (the case of NO), it is determined whether or not the moving body 40 has frontward/rearward movement (step S12). Here, the frontward/rearward movement is when the moving body 40 travels straight in the direction of the frontward/rearward axis or when the moving body 40 rotates around the frontward/rearward axis 51.

In the case where the feature point detector 23 determines in step S12 that the moving body 40 has frontward/rearward movement (the case of YES), the feature point detector 23 relatively increases the first density d1 of the first feature points c1 included in the image region (the first region r1) on both the left and right sides of the first image 11 (step S13). On the other hand, in the case where it is determined in step S12 that the moving body 40 does not have frontward/rearward movement (the case of NO), it is determined whether or not the moving body 40 is rotating to the right (step S14).

In the case where the feature point detector 23 determines in step S14 that the moving body 40 is rotating to the right (the case of YES), the feature point detector 23 relatively increases the first density d1 of the first feature points c1 included in the image region (the first region r1) on the left side of the first image 11 (step S15). On the other hand, in the case where it is determined in step S14 that the moving body 40 is not rotating to the right (the case of NO), it is determined whether or not the moving body 40 is rotating to the left (step S16).

In the case where the feature point detector 23 determines in step S16 that the moving body 40 is rotating to the left (the case of YES), the feature point detector 23 relatively increases the first density d1 of the first feature points c1 included in the image region (the first region r1) on the right side of the first image 11 (step S17). On the other hand, in the case where it is determined in step S16 that the moving body 40 is not rotating to the left (the case of NO), the flow ends without increasing or reducing the number of feature points.

Figure 8:
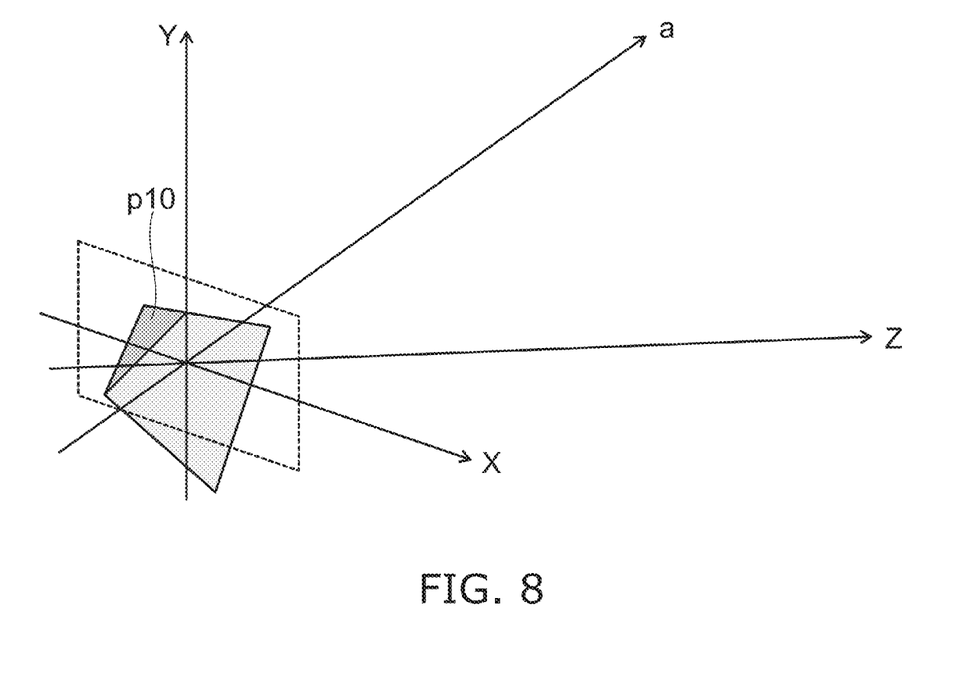
FIG. 8 is a schematic view showing the processing of the feature point detector for an arbitrary rotation.

FIG. 8 is a schematic view showing the processing of the feature point detector 23 for an arbitrary rotation.

Although it is assumed in the example described above that the imaging unit 30 has a planar movement, the invention is applicable similarly in the case where the imaging unit 30 moves arbitrarily in real space. For example, as shown in FIG. 8, in the case where the imaging unit 30 rotates around an a-axis that is a synthesis of the X-axis and the Y-axis, the imaging unit 30 performs an adjustment so that the first density d1 of the first feature points c1 is relatively high in an image portion p10 that is positive in the Z-axis after the rotation.

The feature point detector 23 determines in step S4 whether or not the number of first feature points c1 and the number of second feature points c2 detected are not less than thresholds (step S5). In the case where it is determined that the numbers are less than the thresholds (the case of the NO), the flow returns to step S1 and the processing is repeated. In the case where it is determined in step S5 that the numbers are not less than the thresholds (the case of YES), the position estimator 24 implements the position estimation processing (step S6).

Figure 9A:
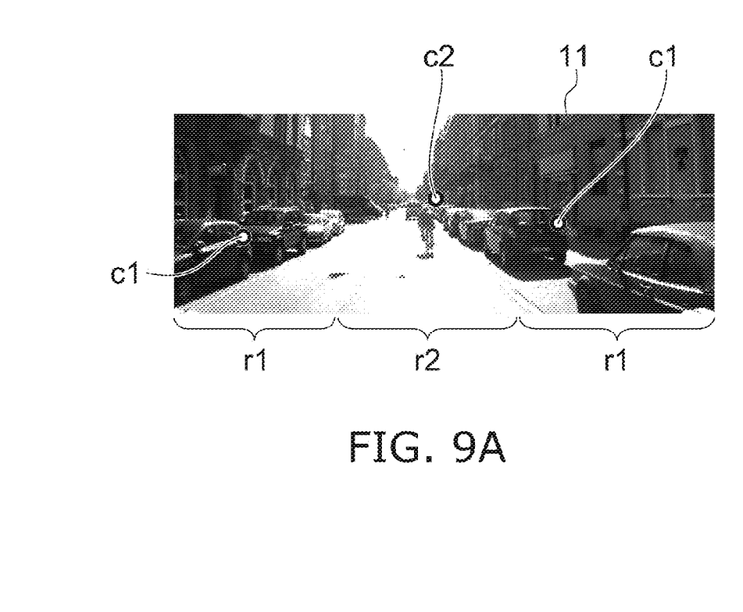
FIG. 9A and FIG. 9B are schematic views showing the processing by the position estimator.
Figure 9B:
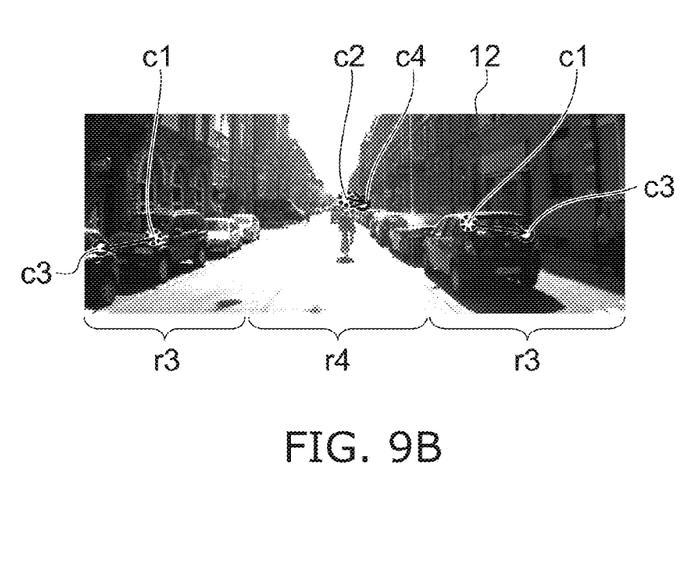

FIG. 9A and FIG. 9B are schematic views showing the processing by the position estimator 24.

FIG. 9A shows the first image 11.

FIG. 9B shows the second image 12 corresponding to the first image 11.

In FIG. 9A and FIG. 9B, the position estimator 24 determines multiple first corresponding points c3 inside the third region r3 of the second image 12. Each of the multiple first corresponding points c3 corresponds respectively to at least one of the multiple first feature points c1. The position estimator 24 implements the position estimation processing to estimate the change of the position of the moving body 40 based on each of the multiple first feature points c1 and each of the multiple first corresponding points c3.

The second image 12 may include the fourth region r4 corresponding to the second region r2. In such a case, the position estimator 24 determines multiple second corresponding points c4 inside the fourth region r4. Each of the multiple second corresponding points c4 corresponds respectively to at least one of the multiple second feature points c2. The position estimator 24 estimates the change of the position of the moving body 40 based on each of the multiple second feature points c2 and each of the multiple second corresponding points c4. In the example, there is one second feature point c2 and one second corresponding point c4.

Generally, the precision of the position estimation increases as the number of corresponding points increases. Therefore, it is more favorable to perform the corresponding point search between the first region r1 and the third region r3 and between the second region r2 and the fourth region r4.

Figure 10:
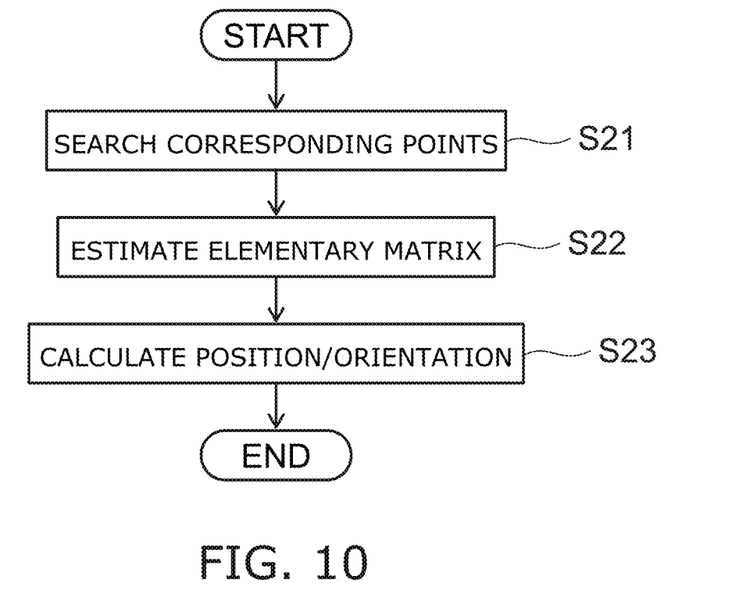
FIG. 10 is a flowchart showing the position estimation processing by the position estimator.

FIG. 10 is a flowchart showing the position estimation processing by the position estimator 24.

The position estimator 24 searches for the first corresponding points c3 and the second corresponding points c4 of the second image 12 using, for example, pattern matching, feature mapping, etc., based on the first feature points c1 and the second feature points c2 detected from the first image 11 (step S21).

The position estimator 24 estimates an elementary matrix having the first image 11 (or the second image 12) as the reference from five or more feature point-corresponding point pairs using, for example, a five-point method, a seven-point method, etc. (step S22). The elementary matrix is a matrix of the relative position/orientation change between two cameras. The translation vector and the rotation matrix are calculated from the estimated elementary matrix using singular value decomposition, etc. The translation vector and the rotation matrix correspond respectively to the position and orientation of the imaging unit 30. Accordingly, the position and orientation of the imaging unit 30 when imaging the second image 12 is obtained and has the position and orientation of the imaging unit 30 when imaging the first image 11 as the reference (step S23). Or, the position and orientation of the imaging unit 30 when imaging the first image 11 is obtained and has the position and orientation of the imaging unit 30 when imaging the second image 12 as the reference. However, the method for estimating the relative position and orientation of the imaging unit 30 from the elementary matrix is an example; and a method for estimating a fundamental matrix, etc., may be utilized. The fundamental matrix is the matrix of the relative position/orientation between the cameras in the case where the camera internal parameters (the focal length, the optical axis center, the distortion characteristics, etc.) are unknown.

According to the embodiment, robust feature point detection for the change of the surrounding environment and the motion of the moving body is possible; and the precision increase and speed increase of the position estimation are robust. Here, "robust" includes, for example, performing a high-precision position estimation. "Robust" includes maintaining the precision of the position estimation while not reducing the processing speed.

Here, the usefulness of the feature points is important when estimating the position of the moving body 40 from the image that is imaged by the imaging unit 30. Here, the usefulness is the ease of tracking of the feature points, the quiescence in three-dimensional real space, the mobility in the image, the spatial unbiasedness, etc. Many methods for utilizing such useful feature points have been proposed. For example, a method of a first reference example includes setting the image regions by experience and setting thresholds for the length of the optical flow for each image region by experience. A method of a second reference example includes roughly estimating an obstacle region using an ultrasonic sensor and adjusting the thresholds for the edge intensity and the brightness difference for each image region according to the obstacle region. A method of a third reference example includes using the relative position and direction between the moving body and the feature points in real space and selecting the feature points to reduce the bias of the feature point positions in real space.

In the first reference example, the estimation precision of the position for the change of the surrounding environment and the movement of the moving body decreases because the thresholds are fixed. Although the thresholds are adjusted dynamically in the second reference example, the ultrasonic sensor is unsuited to distal regions. In the third reference example, it is necessary to measure the positions of the feature points in real space beforehand.

Conversely, according to the embodiment, the positions of the feature points in real space are unnecessary; and robust feature points for the change of the surrounding environment and the movement of the moving body can be detected.

In other words, in the embodiment, the rotation direction (or the translation direction) of the movement of the moving body 40 is estimated based on the first image 11 and the second image 12; and the density of the feature points inside the first image 11 is adjusted dynamically for each region based on the rotation direction (or the translation direction) that is estimated. The first region r1 is determined based on the rotation direction (or the translation direction) of the movement of the moving body 40. It can be said that the first region r1 is the region of the peripheral region of the moving body 40 that most intimately relates to the movement of the moving body 40. Therefore, the precision of the position estimation is increased by causing the first density d1 of the multiple first feature points c1 in the first region r1 to be relatively higher than the second density d2 of the multiple second feature points c2 in the second region r2.

Compared to the first region r1, the relationship between the second region r2 and the moving body 40 is not intimate. Therefore, it is considered that, to some degree, thinning out the second feature points c2 of the second region r2 does not have a large effect. The processing speed can be increased by such thinning out.

Second Embodiment

Figure 11:
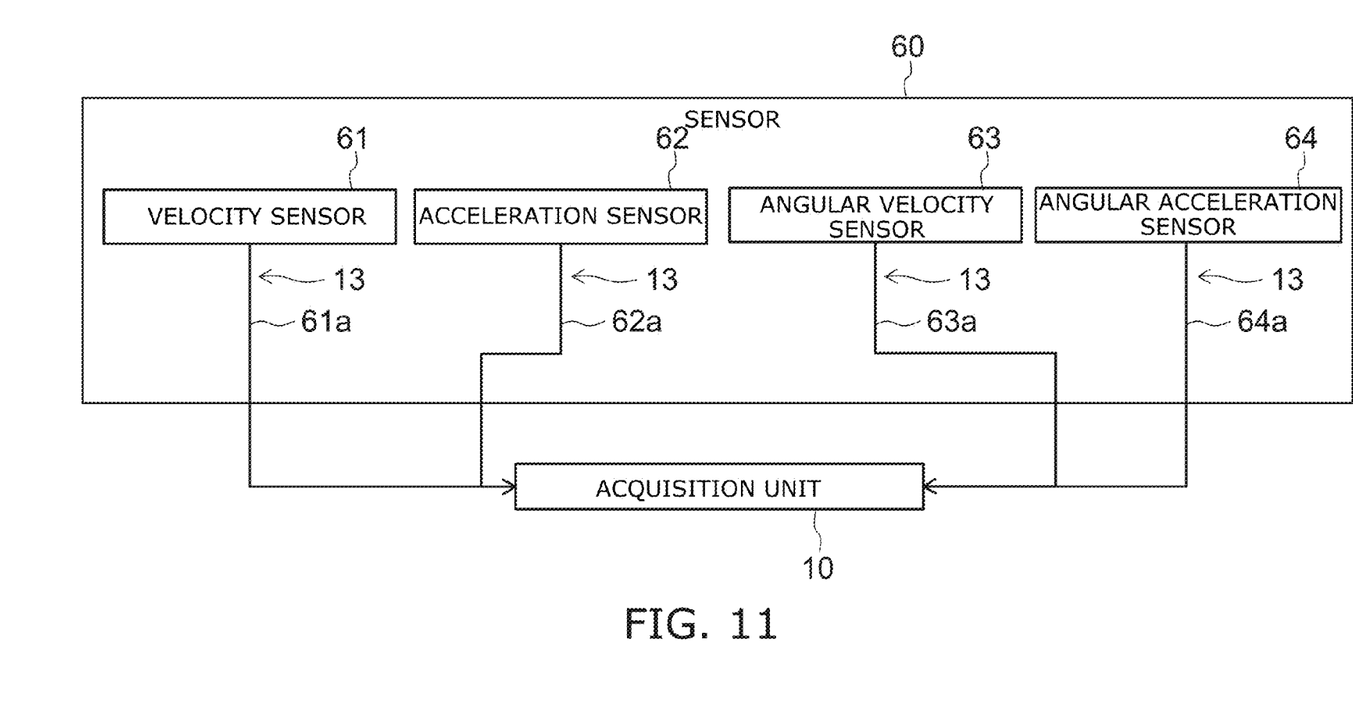
FIG. 11 is a block diagram showing a moving body position estimating device according to a second embodiment.

FIG. 11 is a block diagram showing a moving body position estimating device according to a second embodiment.

In the first embodiment, the rotation direction (or the translation direction) is estimated using two images. In the second embodiment, the rotation direction (or the translation direction) is estimated using a sensor.

A sensor 60 is mounted to the moving body 40. The sensor 60 is mounted to the imaging unit 30. A velocity sensor 61, an acceleration sensor 62, an angular velocity sensor 63, and an angular acceleration sensor 64 are used as the sensor 60. The acquisition unit 10 acquires the information 13. The information 13 includes information 63a relating to the angular velocity obtained by the angular velocity sensor 63. The processor 20 estimates the rotation direction based on the information 63a relating to the angular velocity. The information 13 includes information 64a relating to the angular acceleration obtained by the angular acceleration sensor 64. The processor 20 estimates the rotation direction based on the information 64a relating to the angular acceleration.

The information 13 includes information 61a relating to the velocity obtained by the velocity sensor 61. The processor 20 estimates the translation direction based on the information 61a relating to the velocity. The information 13 includes information 62a relating to the acceleration obtained by the acceleration sensor 62. The processor 20 estimates the translation direction based on the information 62a relating to the acceleration.

The velocity sensor 61 or the acceleration sensor 62 has one or more axes. Also, the angular velocity sensor 63 or the angular acceleration sensor 64 has one or more axes. The movement velocity $\Delta t$ of the imaging unit 30 is $$\Delta t = vo,$$

or $$\Delta t = ao \times \tau$$

where the output of the velocity sensor 61 is $vo$, and the output of the acceleration sensor 62 is $ao$. $\tau$ is time. The translation direction is the direction in which the absolute value of the component of $\Delta t$ is a maximum. However, the method for determining the translation direction is an example.

In the case where the sensor has less than three axes, the Z-component which is the moving body major travel direction is measured preferentially. The rotation $\Delta R$ of the imaging unit 30 is $$\Delta R = \omega o,$$

or $$\Delta R = \alpha o \times \tau$$

where the output of the angular velocity sensor 63 is $\omega o$, and the output of the angular acceleration sensor 64 is $\alpha o$. The rotation direction is the direction in which the absolute value of the component of $\Delta R$ is not less than a threshold. However, the method for determining the rotation direction is an example.

As described above, according to the embodiment, because the rotation direction (or the translation direction) of the imaging unit 30 can be acquired in real time, a robust feature point detection is possible for the abrupt motion of the moving body for which the estimation of the position and the orientation using images is difficult. The precision and speed of the position estimation of the moving body 40 are increased.

The case is described in the example where the imaging unit 30 is mounted so that the depth direction of the imaging unit 30 is the moving body major travel direction. In the case where the mount of the imaging unit 30 is modified, the region subdivision method or the feature point detection method may be modified to match the mounting position and orientation of the imaging unit 30.

Although the moving body position estimating device and the moving body position estimating method are described in the embodiments recited above, the embodiments may be in the form of a moving body position estimating program for causing a computer to execute the moving body position estimating method, or the form of a computer-readable recording medium in which the moving body position estimating program is recorded.

Specifically, CD-ROM (-R/-RW), a magneto-optical disk, a HD (a hard disk), DVD-ROM (-R/-RW/-RAM), a FD (flexible disk), flash memory, a memory card, a memory stick, other various ROM, RAM, etc., may be used as the recording medium recited above; and the method is easy to realize by recording the moving body position estimating program for causing the computer to execute the moving body position estimating method of the embodiment described above in such a recording medium and by distributing the recording medium. The moving body position estimating method of the embodiment can be executed by mounting the recording medium recited above to an information processing device such as a computer, etc., and by the information processing device reading the moving body position estimating program, or by storing the moving body position estimating program in a storage medium included in the information processing device and reading the moving body position estimating program as necessary.

According to the embodiments, a moving body position estimating device, a moving body position estimating method, and a non-transitory recording medium that perform high-precision position estimation can be provided.

Hereinabove, embodiments of the invention are described with reference to specific examples. However, the invention is not limited to these specific examples. For example, one skilled in the art may similarly practice the invention by appropriately selecting specific configurations of components such as the acquisition unit and the processor, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all moving body position estimating devices, moving body position estimating methods, and non-transitory recording mediums practicable by an appropriate design modification by one skilled in the art based on the moving body position estimating devices, the moving body position estimating methods, and the non-transitory recording mediums described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A moving body position estimating device, comprising:
   a memory; and
   processing circuitry configured to:
   acquire information including first data and second data, the first data relating to a first image, the second data relating to a second image, the second image including a difference from the first image accompanying a movement of a moving body, the first image including a first region and a second region;
   estimate, based on the information, a direction of a rotation accompanying the movement; and
   detect, based on the direction of the rotation, a plurality of first feature points inside the first region and a plurality of second feature points inside the second region, a first density of the first feature points inside the first region being higher than a second density of the second feature points inside the second region, wherein
   the direction of the rotation is a first direction, and
   a second direction from the second region toward the first region has a component in a reverse direction of the first direction.

2. The device according to claim 1, wherein
   the processing circuitry is further configured to determine a plurality of first corresponding points inside a third region inside the second image and estimate a change of a position of the moving body based on each of the plurality of first feature points and each of the plurality of first corresponding points, and
   each of the plurality of first corresponding points corresponds respectively to at least one of the plurality of first feature points.

3. The device according to claim 2, wherein a direction from the first region toward the third region is aligned with the second direction when the first image and the second image are overlaid.

4. The device according to claim 2, wherein
   the second image further includes a fourth region corresponding to the second region, and
   the estimating of the change of the position includes determining a plurality of second corresponding points inside the fourth region and estimating the change of the position of the moving body based on each of the plurality of second feature points and each of the plurality of second corresponding points, each of the plurality of second corresponding points corresponding respectively to at least one of the plurality of second feature points.

5. The device according to claim 1, wherein the first direction is one of a left direction and a right direction, and the second direction is the other of the left direction and the right direction.

6. The device according to claim 1, wherein the first direction is one of an upward direction and a downward direction, and the second direction is the other of the upward direction and the downward direction.

7. The device according to claim 1, wherein
the second region includes a center of the first image when an angle of the rotation is not more than a determined value; and
the first region is provided around the second region inside the first image when the angle of the rotation is not more than the determined value.

8. The device according to claim 1, wherein the processing circuitry is further configured to, prior to the detecting, perform image subdivision processing to determine a position inside the first image of the first region and a position inside the first image of the second region.

9. The device according to claim 1, wherein the estimating of the direction of the rotation is based on the first image and the second image.

10. The device according to claim 1, wherein
the information further includes information relating to an angular velocity obtained by a sensor mounted to the moving body, and
the estimating of the direction of the rotation is based on the information relating to the angular velocity.

11. The device according to claim 1, wherein
the information further includes information relating to an angular acceleration output by a sensor mounted to the moving body, and
the estimating of the direction of rotation includes estimating the direction of the rotation based on the information relating to the angular acceleration.

12. The device according to claim 1, wherein the first image and the second image are imaged by an imaging unit mounted to the moving body.

13. A moving body position estimating device, comprising:
a memory; and
processing circuitry configured to:
acquire information including first data and second data, the first data relating to a first image, the second data relating to a second image, the second image including a difference from the first image accompanying a movement of a moving body;
estimate, based on the information, a direction of a change of a position of the moving body accompanying the movement; and
detect, based on the direction of the change of the position, a plurality of first feature points inside a first region inside the first image and a plurality of second feature points inside a second region inside the first image, a first density of the first feature points inside the first region being higher than a second density of the second feature points inside the second region.

14. The device according to claim 13, wherein
the direction of the change of the position is a frontward/rearward direction of the moving body,
the second region includes a center of the first image, and
the first region is provided around the second region inside the first image.

15. The device according to claim 14, wherein
the processing circuitry is further configured to determine a plurality of first corresponding points inside a third region inside the second image and estimate the change of the position of the moving body based on each of the plurality of first feature points and each of the plurality of first corresponding points,
each of the plurality of first corresponding points corresponds respectively to at least one of the plurality of first feature points, and
the first region and the third region overlap when the first image and the second image are overlaid.

16. The device according to claim 13, wherein the estimating of the direction of the change of the position is based on the first image and the second image.

17. The device according to claim 13, wherein
the information further includes information relating to a velocity obtained by a sensor mounted to the moving body, and
the estimating of the direction of the change of the position is based on the information relating to the velocity.

18. The device according to claim 13, wherein
the information further includes information relating to an acceleration obtained by a sensor mounted to the moving body, and
the estimating of the direction of the change of the position is based on the information relating to the acceleration.

19. A moving body position estimating method, comprising:
acquiring information including first data and second data, the first data relating to a first image, the second data relating to a second image, the second image including a difference from the first image accompanying a movement of a moving body;
estimating, based on the information, a direction of a rotation accompanying the movement; and
detecting, based on the direction of the rotation, a plurality of first feature points inside a first region inside the first image and a plurality of second feature points inside a second region inside the first image, a first density of the first feature points inside the first region being higher than a second density of the second feature points inside the second region.

20. A non-transitory recording medium storing a moving body position estimating program which, when executed, causes a computer to execute:
acquiring information including first data and second data, the first data relating to a first image, the second data relating to a second image, the second image including a difference from the first image accompanying a movement of a moving body;
estimating, based on the information, a direction of a rotation accompanying the movement; and
detecting, based on the direction of the rotation, a plurality of first feature points inside a first region inside the first image and a plurality of second feature points inside a second region inside the first image, a first density of the first feature points inside the first region being higher than a second density of the second feature points inside the second region.

* * * * *